(Model.)
2 Sheets—Sheet 1.
P. E. McDONNELL.
CYCLOMETER.
No. 253,481.
Patented Feb. 7, 1882.
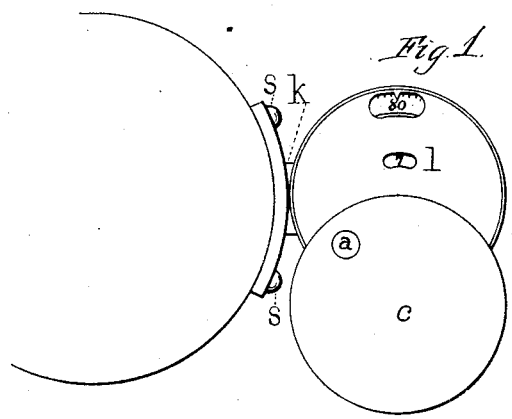
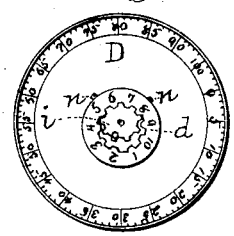
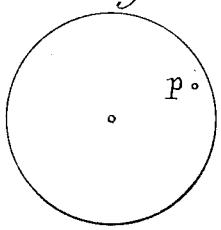
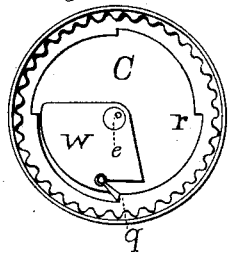
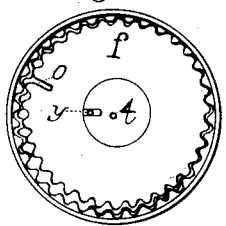
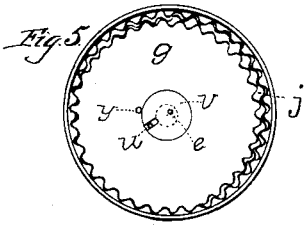
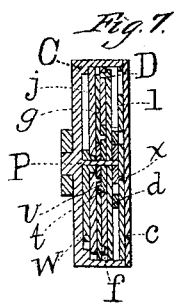
WITNESSES—
F. B. Townsend
Miles Kehoe
INVENTOR—
Patrick Eneas McDonnell (Model.)
2 Sheets—Sheet 2.
P. E. McDONNELL.
CYCLOMETER.
No. 253,481. Patented Feb. 7, 1882.
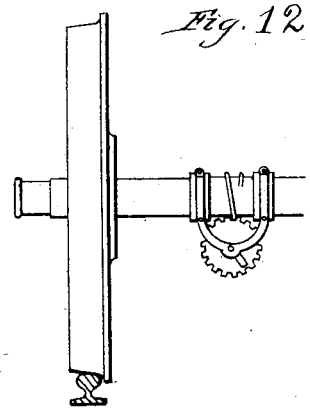
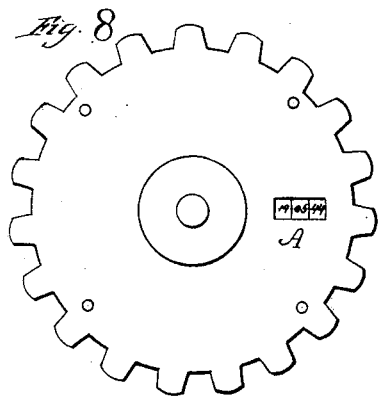
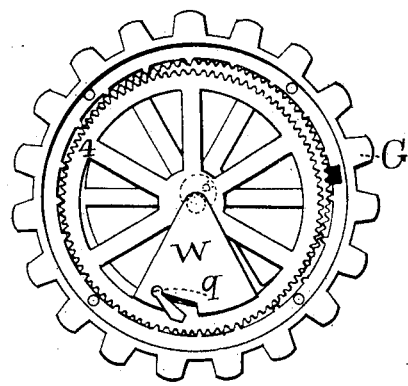
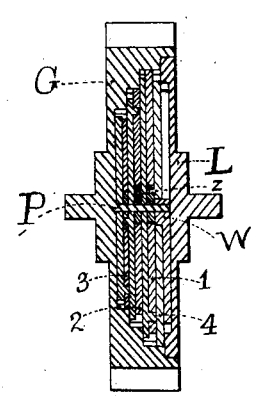
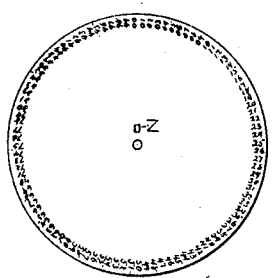
Witnesses
F. B. Townsend
Miles Kehoe
Inventor
Patrick Eneas McDonnell

UNITED STATES PATENT OFFICE.

PATRICK E. McDONNELL, OF LAWNDALE, CHICAGO, ASSIGNOR OF ONE-HALF TO BERNARD McMANUS, OF CHICAGO, ILLINOIS.

CYCLOMETER.

SPECIFICATION forming part of Letters Patent No. 253,481, dated February 7, 1882.

Application filed November 22, 1880. (Model.)

*To all whom it may concern:*

Be it known that I, PATRICK ENEAS McDONNELL, of Lawndale, in the city of Chicago, State of Illinois, have invented an Improved Odometer and Register, of which the following is a specification.

The invention relates to improvements in machines for registering the number of revolutions in machinery or of miles for land conveyances.

The object of my invention is to actuate a dial or a series of dials for recording the number of revolutions either in tens, hundreds, thousands, millions, or as high in the scale of numerals as may be required, or to register the number of revolutions either in miles for land conveyances, in gallons for water-meters, and in feet for gas-meters, as the case may be, with the fewest parts and least friction possible, and have it sealed up, so that it cannot be tampered with or that water or dust may not get into it. I attain these objects by the mechanism illustrated in the accompanying drawings, which represent one for buggies and carriages and one for railroad-cars, in which—

Figure 1 represents a full-sized view of an odometer for buggies and carriages as fastened to the hub of a buggy-wheel by screws *s s*, with the cover *c* swung back to the right on a pivot, *a*, that is rigid to lid *l*. When it is not necessary to see the numbers on the dials, (which in this instance show seven hundred and eighty miles,) the cover *c* is moved to the left, completely covering the entire face, and retained in that position by any suitable means. Fig. 2 represents it with the lid *l*, cover *c*, and shank *k* removed. The dial D is divided by one hundred dots, each representing one mile, with every fifth mile numbered, beginning at 5. The dial *d* is numbered from 1 to 10, and makes one revolution every time the dial D makes ten. Fig. 3 shows the back of dial D, *p* being a pin that meshes in the slot *o* in wheel *f*, Fig. 4. Fig. 4 shows Fig. 2 with the dials D *d* and small wheel *i* removed. Fig. 5 shows Fig. 4 with wheel *f* and slotted eccentric *t* removed. Fig. 6 shows Fig. 5 with wheels *g j* and slotted eccentric *v* removed. Fig. 7 is a sectional view of Fig. 1. Fig. 8 represents a half-sized view of an odometer for railroad-cars. Fig. 9 is a back view of Fig. 8, with the lid L removed. Fig. 10 is a sectional view of Fig. 8. Fig. 11 represents one of the dials in Fig. 8, of which there are three, graded in size as shown in the eye-piece A, Fig. 8, and numbered from 1 to 100, with a cipher placed before the single digits and the unit removed from 100. Fig. 12 shows how the odometer, Fig. 8, is attached to a car-axle by a clasp and worm.

C, Figs. 6 and 7, is a case with thirty-five cogs on its inside. The wheels *f g j*, Figs. 4, 5, 7, have thirty-four cogs each. On the center pin, P, Fig. 7, hangs a weight, *w*, Fig. 6, having an eccentric, *e*, also hanging on the pin P, but rigid to *w*. *e* fills the hole in the center of wheel *j*. By placing the wheel *j* on the eccentric *e* it will be in mesh with the cogs in the case C direct with the stroke of said eccentric. If the case C is rotated to the left one revolution, the weight *w*, being retained at the bottom by its own gravity, causes the wheel *j* to mesh with the thirty-five cogs in the case C, thus making it go one cog more than its revolution, so that when the case C makes thirty-four revolutions the wheel *j* will make thirty-five, or one entire revolution in the case. Wheel *j* has a pin or shoulder, *u*, that meshes in the slotted eccentric *v*, Figs. 5 and 7, giving it the same number of revolutions with itself. *v* fills the hole in the center of wheel *g* and meshes it with the case the same as wheel *j* is meshed by eccentric *e*. The eccentrics *t v e* rotate on the center pin, P, and all have the same stroke; but *t* is twice the distance of the stroke larger than *v*, and *v* bears the same relation to *e*. This is necessary to allow the wheels *f j g* to make the rotary reciprocating movement required to mesh them with the case C at different periods, and not have the pins *y* and *u*, Figs. 4, 5, and 7, come in contact with the next eccentric. When the eccentric *v* and wheel *j* gain one rotation on the case C wheel *g* gains one cog, so the case C must make thirty-four times thirty-four, or one thousand one hundred and fifty-six, revolutions to cause the wheel *g* to gain one revolution. The wheel *g* has a pin, *y*, that meshes in the slotted eccentric *t*, Fig. 4, controlling it the same as *j* controls *v*, with the same result. Thus the case C must make the cube of 34, or thirty-nine thousand three hundred and four revolutions, to cause the wheel $f$ to gain one, this being about the number of times a buggy-wheel of the ordinary size rotates in passing over one hundred miles, or 393.04 in one mile. The wheel $f$ rotates the dial D with itself, pin $p$ and slot $o$ being meshed, and carries the dots and figures under the pointer shown at 80, Fig. 1. The dial $d$ has ten internal cogs, that mesh with the wheel $i$, having nine external cogs. The wheel $i$ is placed on the center pin, P, and retained from rotation by a pin or shoulder, $x$, Fig. 7, projecting into the lid $l$. On the dial D, Fig. 2, are two shoulders, $n\ n$, that keep the dial $d$ in mesh with the wheel $i$. When dial D makes one revolution it meshes dial $d$ with the nine cogs on wheel $i$, thereby carrying said dial ahead one cog, and showing another number under the eye-piece in lid $l$, Fig. 1. A piece of mica the size of lid $l$ is placed against its under side, and the mica and lid hermetically sealed to the case C, thus making it water and dust proof, and so that it cannot easily be tampered with. As the weight $w$ is the motive power, all that is required is to rotate the odometer to cause it to register.

Another important feature in my invention is that the wheels and dials rotate in the same direction when the odometer is turned to the right that they do when it is turned to the left. I accomplish this by the pawl $q$, attached to the weighted eccentric $e\ w$, in connection with the four ratchets $r$, Fig. 6. I have previously stated that by turning the case C to the left the weight $w$ will remain at the bottom, thereby furnishing the power to drive the wheels and dials. If the case C is revolved to the right, the pawl $q$, falling by its own weight, meshes in one of the ratchets, as seen in the drawings, and prevents the weight $w$ from remaining at the bottom, but instead lifts it up to the top and allows it to fall over, moving in the same direction as if rotated to the left, and catches in the opposite ratchet, making one half-revolution for every one half-revolution made by the case C. This will be more readily understood by viewing Fig. 6 inverted.

In the odometer for railroad-cars I register one million of miles as the highest number with three dials, 190,544 being shown in the eye-piece A, Fig. 8. I accomplish this by having one hundred and one cogs in the case G, Figs. 9 and 10, and one hundred cogs in each of three wheels that mesh with the case, and which I will designate Nos. 1, 2, 3, Fig. 10. There is also a wheel, No. 4, with ninety-eight cogs, that mesh with the one hundred and one cogs in the case, which I will describe more definitely hereinafter. It is required to have three different sizes, as shown in Fig. 10, so that the numbers on each dial may be seen through the eye-piece A.

In Fig. 9 it will be seen that there are but about twenty cogs in the case. This is merely to facilitate the manufacture, as the proper space is there for one hundred and one. The wheels Nos. 1, 2, 3, each having one hundred cogs, when meshed the entire circumference of the case G, gain one cog. They are meshed by eccentrics, same as the one for the buggy that I have just described, each wheel governing the next by an eccentric, the only difference being that I place a dial on each wheel marked by one hundred numbers, Fig. 11, and it being between the wheel and the next eccentric, the wheel moves the dial by a shoulder and slot, and the dial moves the eccentric. (See Fig. 10.) Each cog gained on wheel No. 1 represents one mile, each cog gained on wheel No. 2 represents one hundred times that of wheel No. 1, and each cog gained on wheel No. 3 represents one hundred times that of wheel No. 2, or the cube of 100 as the greatest number.

It will be understood that there will be nothing gained on the dial of wheel No. 2 until wheel No. 1 gains at least eighty cogs, the reason for this being that the dials rotate on the center pin, P, Fig. 10, and the wheels being moved by eccentrics make a rotary reciprocating motion, and have to make nearly twice the distance of the stroke before they move the dial perceptibly. So it is while the wheels Nos. 1 and 2 are moving from numbers 80 to 100 that the next dials are moved one number.

I now come to wheel No. 4, which I make with ninety-eight cogs in the present instance. This wheel is governed by the weighted eccentric $w$, Fig. 10, and, as it gains three cogs for every revolution of the case G, it requires thirty-two and two-thirds revolutions of the case G to make one more of this wheel No. 4, which in turn governs wheel No. 1 by an eccentric, showing one number on the dial of wheel No. 1.

To allow the car axle and wheel to make the proper number of rotations to pass over the distance of one mile, which in this case is six hundred and twenty and two-thirds, I make the case G with nineteen cogs on its outer surface and rotate it by a worm placed on the axle, Fig. 12. It requires nineteen rotations of the car-wheel to give G one rotation, and $19 \times 32\tfrac{2}{3} = 620\tfrac{2}{3}$.

To give any required number of revolutions before showing one number on the dial of wheel No. 1, all that is necessary is to change the number of cogs on the wheel No. 4 and the case G.

The lid L, Fig. 10, is riveted and hermetically sealed, and does not allow of tampering.

To tell the distance a vehicle passes over in a certain time, the number when it goes out is subtracted from the number when it comes in, and the difference is what it has traveled.

Having thus described my invention, what I claim as new, and wish to secure by Letters Patent, is—

1. An odometer or register the case of which is provided with internal gears, in which mesh wheels of a less number of gears, each wheel controlling the next by an eccentric having a slot or a shoulder, in which meshes a slot or a shoulder of the wheel rotating it, substantially as and for the purpose set forth.

2. In combination with an odometer or register the case of which is provided with internal gears, in which mesh wheels of a less number of gears, each wheel controlling the next by an eccentric having a slot or a shoulder, in which meshes a slot or a shoulder of the wheel rotating it, the weighted eccentric $e\ w$, pawl $q$, and ratchets $r$, substantially as and for the purpose set forth.

3. In an odometer or register substantially as described, the combination of the wheel $i$, dial $d$, and shoulders $n\ n$, as and for the purpose set forth.

PATRICK ENEAS McDONNELL.

Witnesses:
PATRICK McMANUS,
LAURENCE WELTZER.